(12) United States Patent
Wynn et al.

(10) Patent No.: US 12,034,186 B2
(45) Date of Patent: *Jul. 9, 2024

(54) BATTERY PACK WATER DRAIN SYSTEM

(71) Applicant: Rivian IP Holdings, LLC, Plymouth, MI (US)

(72) Inventors: Nathaniel C. Wynn, Tustin, CA (US); Vignesh Sekar, Westland, MI (US); Kyle Butterfield, Ladera Ranch, CA (US); Tyler Collins, Irvine, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/883,170

(22) Filed: Aug. 8, 2022

(65) Prior Publication Data

US 2023/0020216 A1     Jan. 19, 2023

Related U.S. Application Data

(63) Continuation of application No. 16/680,346, filed on Nov. 11, 2019, now Pat. No. 11,431,066.

(Continued)

(51) Int. Cl.
    *H01M 50/691*     (2021.01)
    *B60L 50/64*     (2019.01)
    *H01M 50/204*     (2021.01)
    *H01M 50/249*     (2021.01)
    *H01M 50/264*     (2021.01)
    *H01M 50/291*     (2021.01)

(52) U.S. Cl.
CPC ........... *H01M 50/691* (2021.01); *B60L 50/64* (2019.02); *H01M 50/249* (2021.01); *H01M 50/264* (2021.01); *H01M 50/291* (2021.01); *H01M 50/204* (2021.01); *H01M 2220/20* (2013.01)

(58) Field of Classification Search
None
See application file for complete search history.

(56) References Cited

U.S. PATENT DOCUMENTS 5,639,571 A * 6/1997 Waters .............. H01M 10/6563
    180/68.5
11,431,066 B2 * 8/2022 Wynn ................. H01M 50/249

(Continued)

FOREIGN PATENT DOCUMENTS

CN      207967074 U    10/2018
JP      2007-331719 A    12/2007

(Continued)

OTHER PUBLICATIONS

Abstract of JP-2011173447-A. (Year: 2011).*
PCT International Search Report for International Application No. PCT/US2019/060789, dated Feb. 27, 2020 (14 pages).

*Primary Examiner* — Gregg Cantelmo
(74) *Attorney, Agent, or Firm* — HALEY GUILIANO LLP

(57) ABSTRACT

A drain system is described for allowing fluid to drain from a battery pack while maintaining structural integrity of the battery pack. A frame of the battery pack is comprised of several retaining members in which valves are disposed to allow fluid to exit the battery pack. The valves are positioned such that forces normally experienced while driving a vehicle, such as acceleration, deceleration, and turning forces, cause the fluid to flow toward and through the valves.

20 Claims, 7 Drawing Sheets

Related U.S. Application Data

(60) Provisional application No. 62/760,453, filed on Nov. 13, 2018.

(56) References Cited

U.S. PATENT DOCUMENTS

| | | | |
|---|---|---|---|
| 2009/0246606 A1 | 10/2009 | Shimizu | |
| 2012/0121959 A1 | 5/2012 | Yamada | |
| 2012/0231306 A1 | 9/2012 | Herron et al. | |
| 2012/0251848 A1 | 10/2012 | Cho | |
| 2013/0130073 A1 | 5/2013 | Kim et al. | |
| 2013/0143081 A1* | 6/2013 | Watanabe | H01M 50/204 |
| | | | 429/71 |
| 2013/0224540 A1 | 8/2013 | Cha | |
| 2013/0248263 A1 | 9/2013 | Umetani | |
| 2014/0332085 A1* | 11/2014 | Grace | H01M 10/625 |
| | | | 429/82 |
| 2016/0233482 A1* | 8/2016 | Bosch | H01M 50/271 |
| 2016/0344061 A1* | 11/2016 | Maguire | H01M 10/647 |
| 2017/0305250 A1 | 10/2017 | Hara | |
| 2018/0051930 A1 | 2/2018 | Hirato et al. | |
| 2018/0151930 A1 | 5/2018 | Kim et al. | |
| 2019/0312322 A1* | 10/2019 | Ahn | H01M 50/262 |

FOREIGN PATENT DOCUMENTS

| | | | |
|---|---|---|---|
| JP | 2011-173447 A | | 9/2011 |
| JP | 2011173447 A | * | 9/2011 |
| JP | 2014-165004 A | | 9/2014 |
| WO | 2018/023050 A1 | | 2/2018 |

* cited by examiner

BATTERY PACK WATER DRAIN SYSTEM

CROSS REFERENCE TO RELATED APPLICATION

This disclosure is a continuation of U.S. patent application Ser. No. 16/680,346, filed Nov. 11, 2019, now U.S. Pat. No. 11,431,066, which claims the benefit of U.S. Provisional Application No. 62/760,453, filed on Nov. 13, 2018, both of which are hereby incorporated by reference herein in their entireties.

SUMMARY

This disclosure relates to automotive battery packs and, in particular, to directing and allowing fluids to exit the battery pack.

A typical automotive battery pack may be designed to withstand a wide range of environmental conditions, such as a wide range of temperatures (e.g., environmental temperatures from −40° C. to 60° C.), humidity, air pressure, etc. For example, if a particular defined volume is held constant, the pressure within that area may have a large spread variation, such as approximately 40% to accommodate a full range of conditions. In other instances the volume available to accommodate the molecules of air within the battery enclosure could also vary in accordance with changed conditions (e.g., approximately 40% volume change). If a pressure change such as a 40% pressure change were to occur based on an original pressure of 1 atmosphere, the change could be as much as 400 mbar, which may be enough of a pressure change to damage or otherwise impact seals or lids that encompass the volume.

In an exemplary battery pack, an interior air volume (e.g., 40-90 L) that experiences a very large change in volume may exert severe forces on any sealing components. Attempts to alleviate a large pressure change by removing a portion of air (e.g., using a bellows-type volume exchange system) may not be feasible in a vehicle, where space for operational components and rider comfort is paramount. For example, given an exemplary battery pack with an interior air volume of 70 L, any bellows-type volume exchange system would need to be able to hold on the order of 30 L of air to accommodate a 40% change in volume. Accordingly, a gas-exchange system of some sort may be utilized, e.g., to exchange air with the environment outside of the vehicle.

A water molecule (approximately 2.75 angstroms in length) is smaller than a nitrogen molecule (approximately 3.7 angstroms in length). As such, any membrane designed to equalize pressure by air transfer must let gaseous water molecules through. As the battery pack thermally cycles, this exchange will enable condensation if the dew point is exceeded. In this manner, a battery pack that is operating in a cold or high-humidity environment may exceed the dew point, which may cause water to form on the battery pack and drain to adjacent surfaces. If the water level increases too much, debris and corrosion may cause isolation failures over time. As such, a fluid exchange system may be utilized to drain water from the battery pack or the environment of the battery pack (e.g., a frame for accommodating multiple water packs). To allow fluid to drain from the battery pack, a plurality of valves may be located on one or more of a plurality of retaining members which comprise the frame of the battery pack, wherein the plurality of valves allow liquid to exit the battery frame.

In some embodiments, a battery frame intended for a vehicle should be able to withstand forces encountered during driving as well as blunt forces, such as those caused by a ground strike (e.g., from rebar, trailer hitches, antlers, rocks, etc.). Vehicles may also be utilized off road, which means that a battery frame must be able to withstand ground strike at full vehicle weight on very sharp rocks, trees, etc.

In some embodiments, the battery frame comprises a base plate, a plurality of retaining members fixedly connected from the base plate, wherein the plurality of retaining members extend from the base plate in a vertical direction, and a plurality of cross members coupled to at least one of the base plate or one or more of the plurality of retaining members. In some embodiments, one or more of the plurality of cross members may be coupled only to the base plate or only to the plurality of retaining members. In some embodiments, one or more of the plurality of cross members is may be coupled to a plurality of the retaining members. The configuration of the base plate, retaining members, and cross members defines a plurality of at least partial cavities for a plurality of battery modules.

In some embodiments, the base plate is coupled to each of the retaining members at an angle. The angle formed between a level surface and the base plate when coupled to the retaining members may be at least three degrees in a direction from front to rear of the battery frame, though in some embodiments the angle comprises a high region at the front of the battery frame and a low region at the rear of the battery frame.

In some embodiments, the base plate may not include any through holes, while in other embodiments the base play may include any number of through holes. Substantially all through holes in the base plate may be filled or covered. For example, each through hole may be covered or filled by a weld or a bolt.

The retaining members which form the battery frame may include two side retaining members, a front retaining member, and a rear retaining member. The plurality of valves may be located on the side retaining members only. In some embodiments, however, the plurality of valves may be located on the rear retaining member only. In yet other embodiments, at least one valve may be located on the side retaining members and at least one valve may be located on the rear retaining member. The valves may be located on a rear lower portion of at least one of the side retaining members. The valves may also be located on a lower portion of the rear retaining member. The valves may be one-way valves, only allowing fluid to exit the battery frame.

The base plate may further include one or more channels. The channels may direct the flow of liquid to one or more of the plurality of valves. One or more of the plurality of cross members may include one or more fluid passages at an end thereof nearest to the base plate.

Battery modules may be attached to the base plate, the retaining members, and/or the cross members. The battery modules may also include one or more fluid passages at an end of thereof closest to the base plate.

In some embodiments, the battery frame comprises a base plate, a retaining structure fixedly connected to the base plate, wherein the retaining structure extends from the base plate tin a vertical direction, a battery attachment structure coupled to at least one of the base plate or retaining structure, wherein the base plate, the retaining structure, and the battery attachment structure define a plurality of at least partial cavities for a plurality of battery modules, and a plurality of valves located on the retaining structure, wherein the plurality of valves allow liquid to exit the battery frame. The valves may be located to facilitate exit of the liquid during forward acceleration of a vehicle, deceleration of a vehicle, and/or turning of a vehicle.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
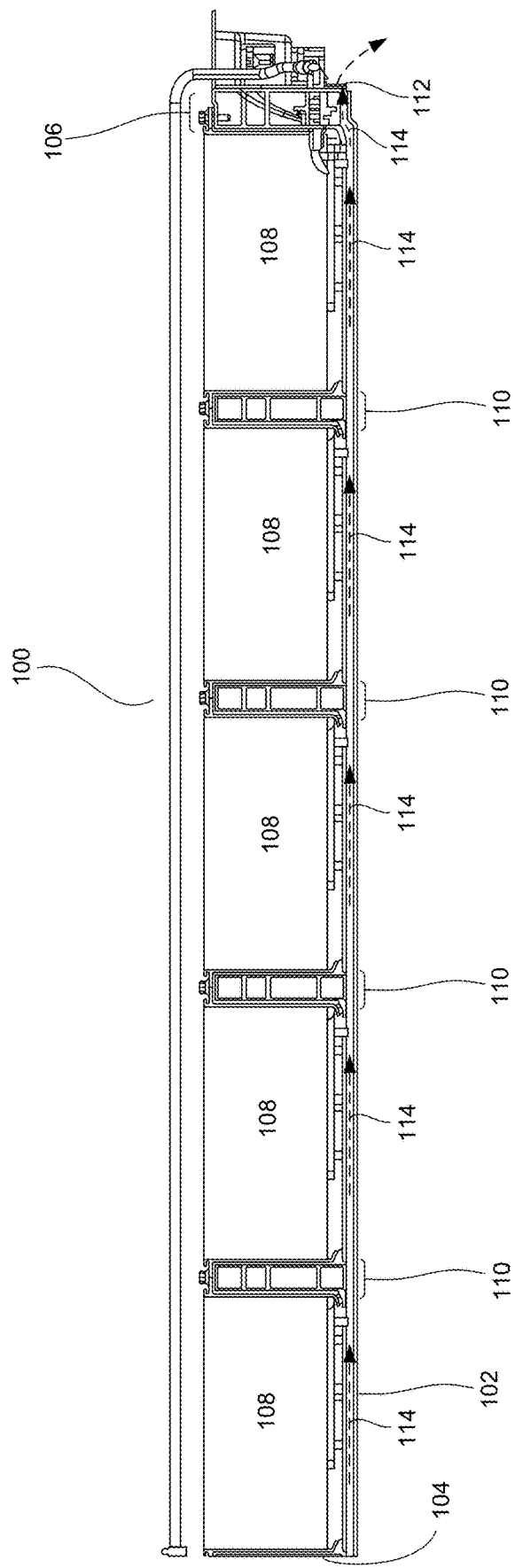
FIG. 1 depicts a side section view of an exemplary battery pack water drain system in accordance with some embodiments of the present disclosure.

FIG. 1 depicts a side section view of an exemplary battery pack water drain system in accordance with the present disclosure. In the exemplary embodiment depicted in FIG. 1, a battery frame 100 includes a bottom base plate 102, a front retaining member 104, and a rear retaining member 106. Side retaining members are not depicted in this section view, but collectively these members and base plate 102 form a frame for holding and attaching battery modules 108, for example, at a bottom of a vehicle. Although the retaining structure may be described as having a number of members, the members may be formed as any suitable number of pieces. Cross members 110 may be attached within the retaining structure and may provide structural support for the frame and vehicle as well as an attachment area for battery modules 108. Battery modules 108 may include battery packs and other components (controls, cooling, etc.) and may be seated within the retaining frame and cross members and attached thereto. Base plate 102, retaining members 104, 106, cross members 110, and battery modules 108 may be configured as described herein (e.g., with fluid passages, guides, etc.) to facilitate a fluid path within the battery pack water drain system, for example, towards the bottom rear of the battery frame 100 towards a valve 112. This fluid flow may be further facilitated by the fluid path 114 and valve 112 being located within the battery frame 100 to take advantage of forces applied during vehicle operation, such as acceleration, deceleration, and turning. These forces may cause fluid to flow toward and out of valve 112.

In some embodiments, base plate 102 is coupled to retaining members 104, 106 at an angle. This may encourage flow of fluid towards valve 112. For example, if valve 112 is located in rear retaining member 106, base plate 102 may be coupled to retaining members 104, 106 such that base plate 102 is lower at the point where it is coupled to rear retaining member 106 than at the point where it is coupled to front retaining member 104. The angle formed between base plate 102 and a level surface may be any angle sufficient to encourage flow of fluid toward valve 112, such as three degrees. In another embodiment, a vehicle in which battery frame 100 is installed may comprise a controlled-height suspension system, e.g., an air, hydraulic, or electrically actuated suspension system. The vehicle may adjust rake and/or tilt when the vehicle is parked, i.e., the rear of the vehicle being lower than the front with respect to gravity and/or the surface on which the vehicle is parked, thereby encouraging flow of fluid toward valve 112.

Figure 2:
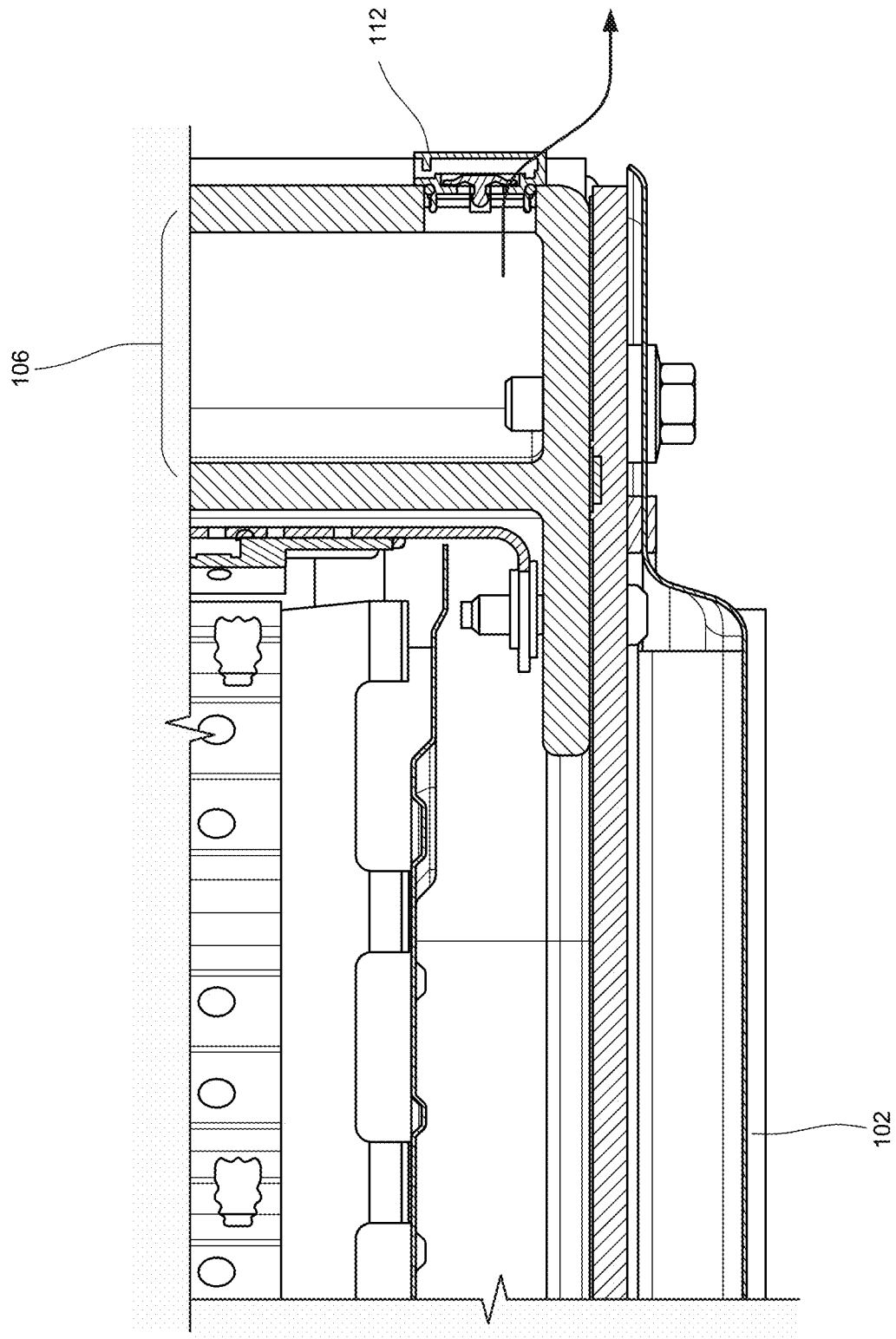
FIG. 2 depicts a side section view of a portion of an exemplary battery pack water drain system in which a valve is disposed in accordance with some embodiments of the present disclosure.

FIG. 2 depicts a side section view of a rear portion of an exemplary battery pack water drain system in accordance with the present disclosure. As fluid reaches the rear end of base plate 102 it may begin to accumulate against rear retaining member 106. As the fluid accumulates, the level may rise to reach valve 112 which is located in a lower portion of rear retaining member 106. The fluid may then flow out of valve 112, as indicated by the arrow depicted in FIG. 2.

Figure 3:
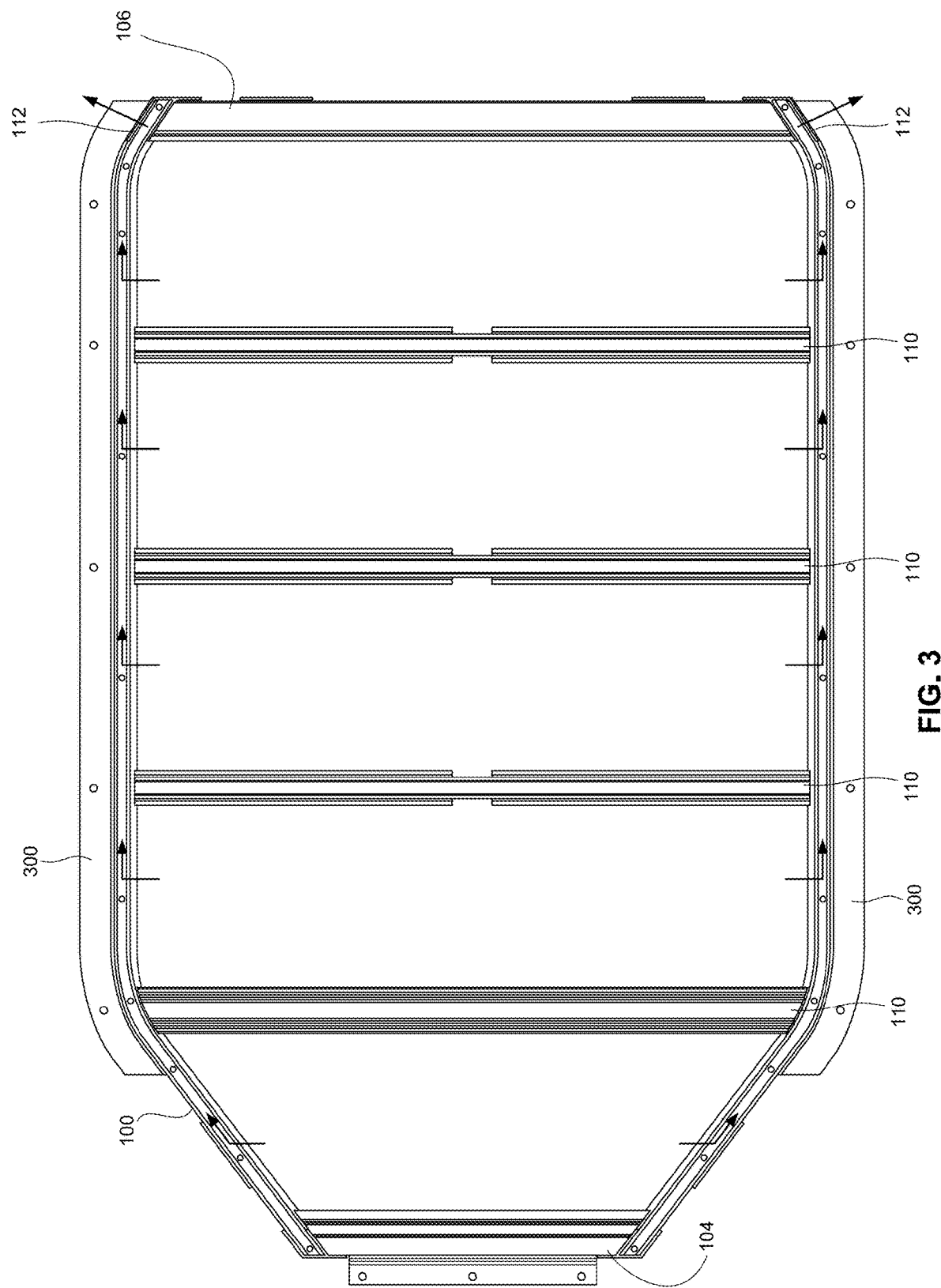
FIG. 3 depicts a top view of an exemplary battery pack water drain system in accordance with some embodiments of the present disclosure.
Figure 4:
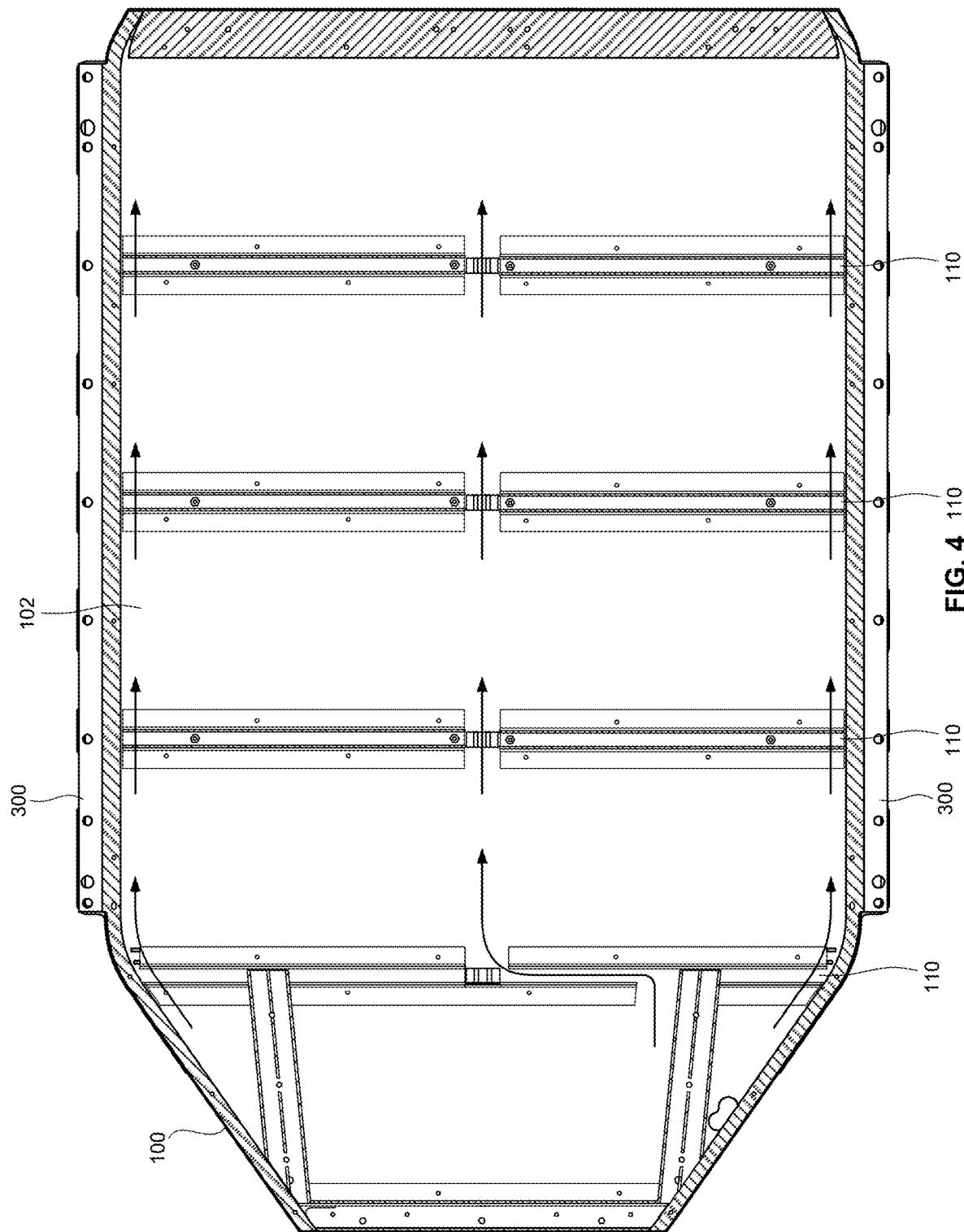
FIG. 4 depicts a second top view of an exemplary battery pack water drain system in accordance with some embodiments of the present disclosure.
Figure 5:
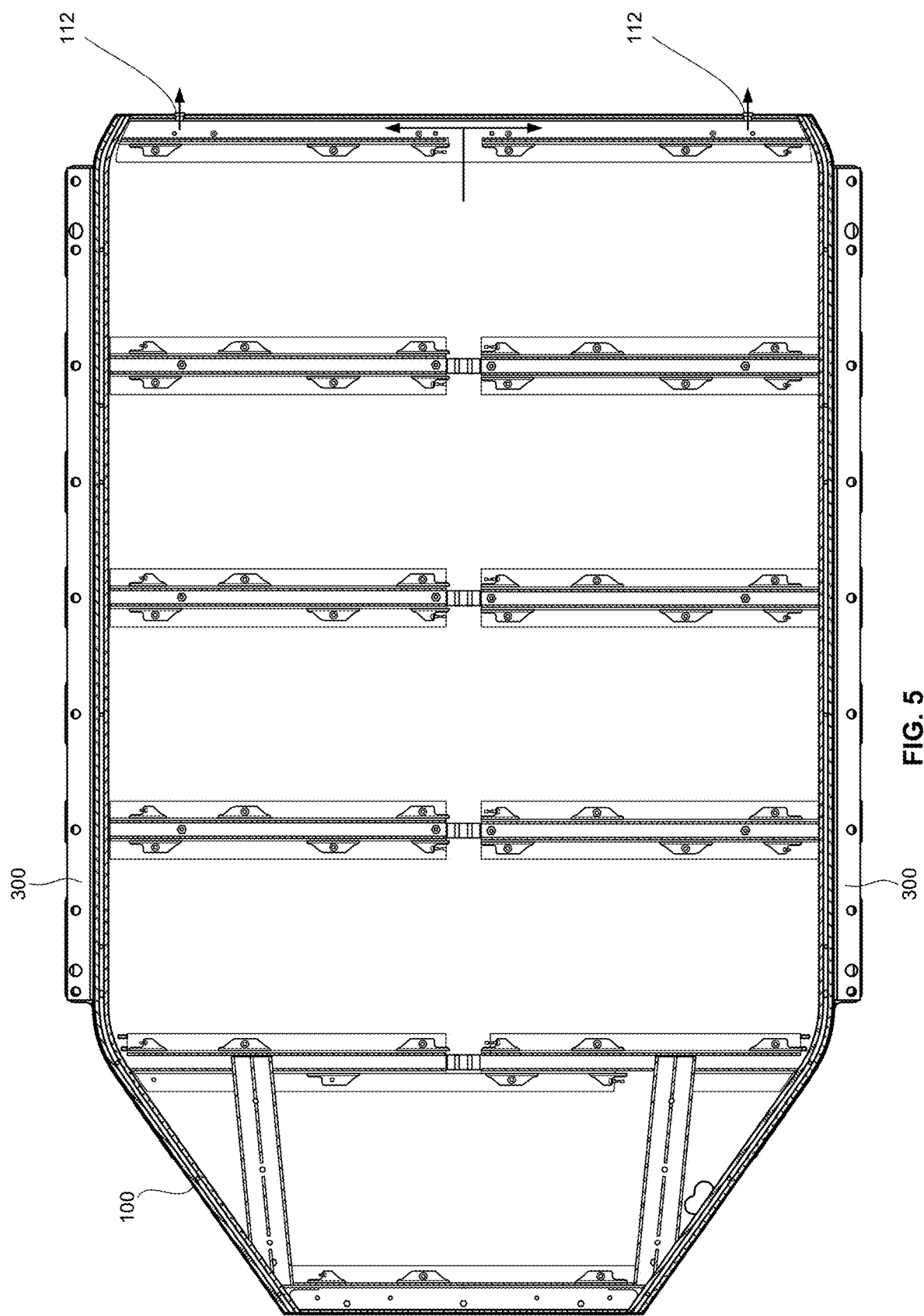
FIG. 5 depicts a third top view of an exemplary battery pack water drain system in accordance with some embodiments of the present disclosure.

FIG. 3 depicts a top view of an exemplary battery pack water drain system in accordance with some embodiments of the present disclosure. In the embodiment depicted in FIG. 3, the battery modules (e.g., battery modules 108) are installed between front retaining member 104 and rear retaining member 106, separated by cross members 110. In some embodiments, a retaining structure is generally rectangular with tapered portions based on a shape of a vehicle and can be in any suitable shape to accommodate the particular vehicle and structural needs of the vehicle where the battery system is installed. In the exemplary embodiment depicted in FIG. 3, cross members 110 extend between side members 300, although it will be understood that other configurations (e.g., front to back, interior sections, geometric shapes, etc.) may be employed to accommodate other battery types and vehicle structural needs. Fluid paths lead through the battery pack toward the rear corners of the battery frame 100 where valves 112 are located. As indicated by the arrows shown in FIG. 3, fluid flows out from the areas in which the battery modules are installed toward the outside of battery frame 100. For example, the side members 300 may include one or more channels to collect fluid from the center of the battery pack and enable the fluid to flow towards valves 112 in the rear of the vehicle (e.g., when the vehicle is under acceleration). The side members 300 may include one or more openings in the areas between cross members 110 that enable the water to pass into the side members. When the fluid reaches the rear of battery frame 100, valves 112 release the liquid to the outside of battery frame 100 and, ultimately, out of the vehicle. The arrows shown in FIG. 4 depict a second exemplary fluid path which leads through the battery pack toward the rear of battery frame 100. The fluid passes through fluid passages in cross members 110. The fluid passages may be located in a central portion of the cross members 110 or in a lower portion of the cross members 110 adjacent to the base plate 102 and proximate to side members 300. Fluid passages may also be located in battery modules installed between cross members 110 to allow fluid from any portion of the battery frame to flow toward the valves. As depicted in FIG. 5, valves 112 may be disposed on rear retaining member 106 facing toward the rear of the battery pack, rather than at the corners of the battery pack as shown in FIG. 3. As fluid reaches the rear retaining member 106, indicated by the arrows in FIG.

5, fluid pressure caused by acceleration of the vehicle distributes the fluid along the rear retaining member 106 until the fluid reached valves 112. Upon reaching valves 112, fluid may accumulate until sufficient pressure is exerted on valves 112 to allow the fluid to escape therethrough. Valves 112 may be located in any suitable position on the battery pack to allow fluid to exit the battery pack.

Although FIGS. 1-5 show an embodiment in which the fluid flow structure facilitates movement of fluid in conjunction with acceleration of the vehicle, valves may alternatively or additionally be located in the front of battery frame 100 to release fluid based on vehicle deceleration, and at one or both sides of battery frame 100 to release fluid based on vehicle turning.

Figure 6:
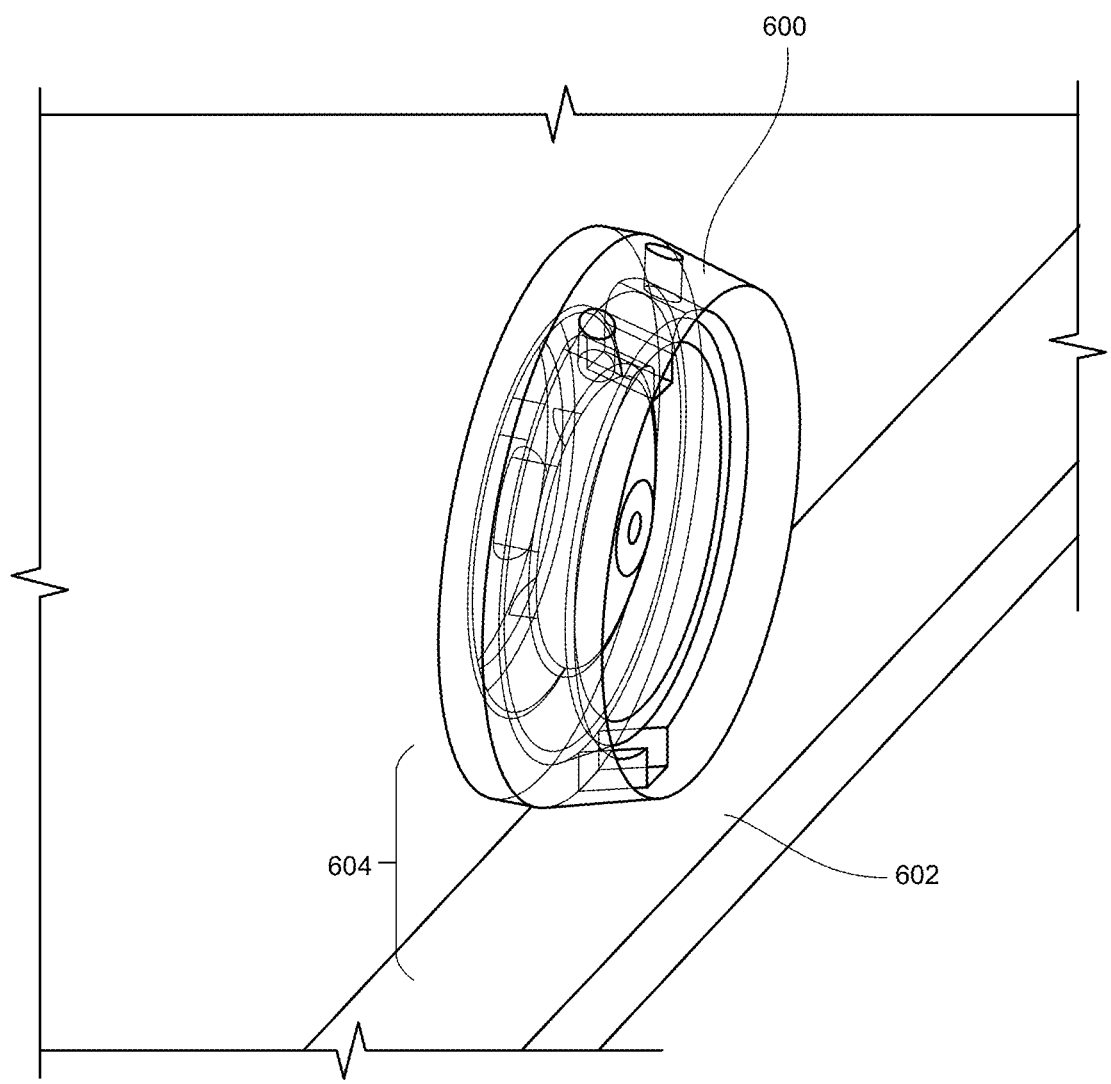
FIG. 6 depicts an exemplary valve in accordance with some embodiments of the present disclosure.
Figure 7:
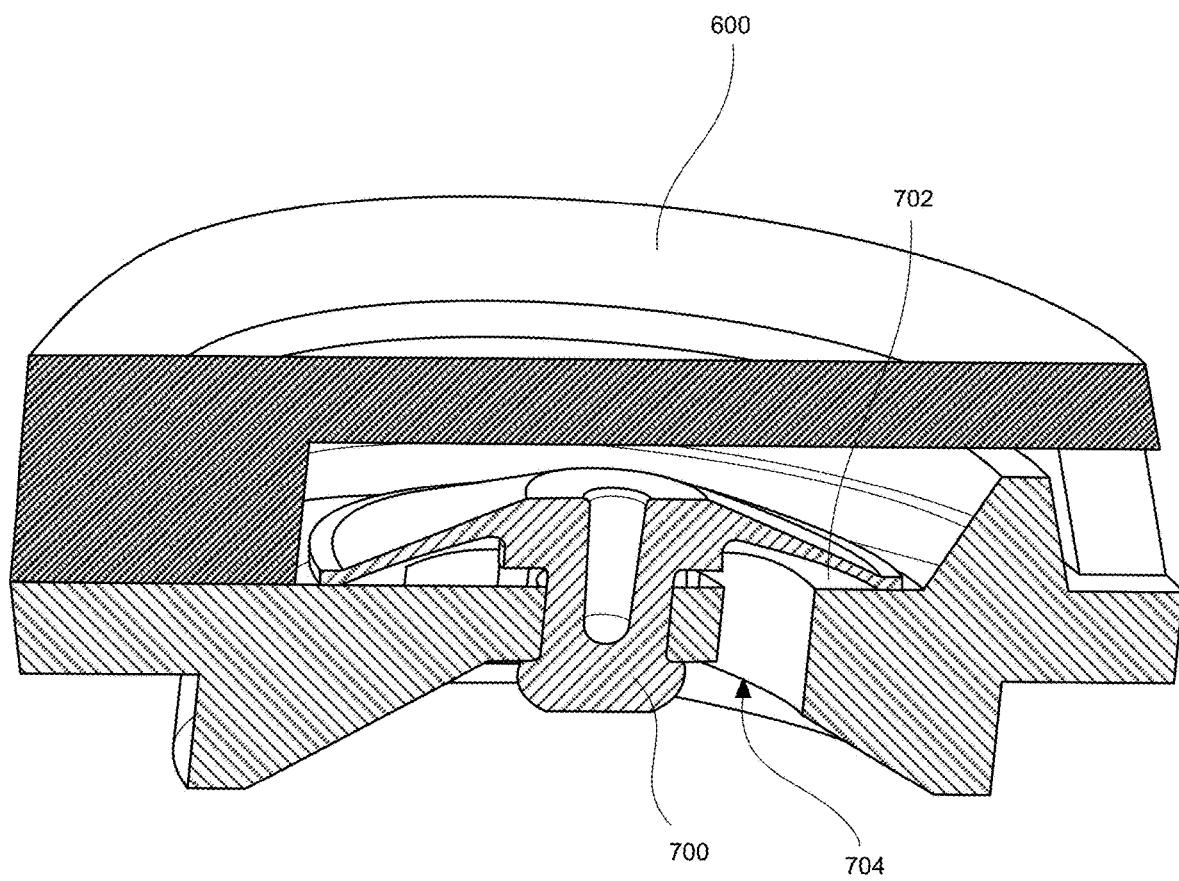
FIG. 7 depicts a cross section of an exemplary valve in accordance with some embodiments of the present disclosure.

FIGS. 6-7 demonstrate an exemplary valve in accordance with some embodiments of the present disclosure. For example, FIG. 6 depicts an exemplary valve 600 located at a bottom portion of the vehicle frame 602. Valve 600 (e.g., valve 112) may be located at a height 604 such that a particular force (acceleration, deceleration, turning) will cause fluid to come into contact with valve 600 with a force that causes the fluid to exit the frame 602 and vehicle. As depicted in FIG. 7, in some embodiments valve 600 may be a one-way valve. In a closed position, valve seal 700 forms a seal against valve seat 702. This prevents fluids from entering battery frame 100 through valve 600. Fluid pressure may be exerted against valve seal 700 from within battery frame 100 by fluid in battery frame 100. Passage 704 allows fluid to enter valve 600. Pressure exerted against valve seal 700 by fluid present in passage 704 may cause a change in the position of valve seal 700, creating a space between valve seal 700 and valve seat 702, allowing fluid to pass through passage 704 and out of battery frame 100. The pressure required to activate valve 600 (i.e., the pressure required to move valve seal 700) may be associated with a particular force (e.g., vehicle acceleration for a rear valve, vehicle deceleration for front valve, turning for a side valve, etc.).

In an exemplary embodiment of the present disclosure a vehicle may include a battery frame 100. A number of battery modules may attach to battery frame 100 and may each include one or more (e.g., two) battery packs. The completed battery frame and module structure may be installed in a vehicle to provide electric power, for example, in a bottom portion of the vehicle under the vehicle cabin. A bottom plate 102 of the battery frame 100 may be directly exposed to the exterior of the vehicle, e.g., and may function as a structural element of the vehicle. In some embodiments, one or more intervening components (e.g., plates, shield drivetrain components) may be installed between at least a portion of bottom plate 102 and the exterior environment. It may be desirable for bottom plate 102 to provide particular structural characteristics, such as long term resistance to forces incurred during driving as well as blunt forces such as ground strikes.

The battery frame 100 may include a number of retaining members 104, 106, 300 that form the peripheral shape of the battery frame. Although battery frame 100 may be at least partially open and have a variety of points for ingress and egress of relevant components, in an exemplary embodiment the retaining members 104, 106, 300 may be coupled (e.g., welded, bolted, etc.) to base plate 102 and extend upwards (e.g., vertically at an angle such as 70, 80, 85, or 90 degrees, depending on the relative positioning of the retaining members and base plate) from the bottom of base plate 102 to define a shape and volume of battery frame 100, for example, extending from the front, sides, and back of base plate 102.

Cross members 110 may be coupled to base plate 102, retaining members 104, 106, 300, or other cross members in a suitable manner to provide particular structural characteristics, provide suitable attachment points for other components of the vehicle, or perform other suitable functions. For example, a number of cross members 110 may extend across battery frame 100 between retaining members 300 to create a number of areas for the installation of battery modules 108, although other geometries may be utilized in other circumstances.

Valves 112 may be located on the retaining surfaces 104, 106, 300 to facilitate the evacuation of a liquid such as water or other vehicle liquids from the retaining surfaces 104, 106, 300. In some embodiments, valves 112 may be one-way valves that prevent liquid from entering battery frame 100 via valves 112. Because of gravity and vehicle movement, liquid will tend to move towards the lowest point within battery frame 100 and towards particular locations within the frame. These patterns of liquid movement may be used to select the locations of valves 112. For example, acceleration may cause movement towards a rear portion of battery frame 100 (e.g., toward rear retaining member 106) and may be experienced relatively frequently during driving. Driving around curves and turning may cause movement of liquid towards side portions of battery frame 100 (e.g., towards side retaining members 300). Braking may cause a deceleration that causes liquid to move towards the front of battery frame 100 (e.g., toward front retaining member 104). Depending on the likely sources of liquid and known patterns of liquid movement, suitable locations (e.g., side and rear corners of the relevant retaining members relatively close (e.g., within 1-3 inches) to bottom plate 102). By limiting or avoiding the placement of valves 112 on bottom plate 102, the structural integrity of bottom plate 102 may be maintained. That is, there may be no through holes in bottom plate 102, a limited numbered of through holes, or any through holes may be filled during assembly of battery frame 100.

In some embodiments bottom plate 102 may be angled such that moisture is likely to move to particular locations thereof. For example, when installed bottom plate 102 may not be perfectly parallel to the ground but instead may form an angle therewith, such that gravity aids in the pooling of liquid in particular locations. Moreover, one or more channels may be formed in bottom plate 102 to direct liquid to particular locations within battery frame 100. In some embodiments cross members 110 may include fluid passages that limit or prevent cross members 110 blocking the flow of liquid in the direction of valves 112. Other components that are seated on bottom plate 102 (e.g., battery modules 108) may also include fluid passages.

The foregoing is merely illustrative of the principles of this disclosure, and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims

What is claimed is:

1. An apparatus, comprising:
a member coupled to a base plate of a battery pack and extending from the base plate, the member comprising:
one or more openings configured to receive liquid collected in a cavity of the battery pack; and
a channel configured to direct the liquid toward a valve configured to allow the liquid to exit the battery pack, wherein the valve is located on a rear retaining member of the apparatus.

2. The apparatus of claim 1, wherein the channel is configured to cause fluid to flow from an area of the battery pack comprising a battery toward the valve.

3. The apparatus of claim 1, wherein the channel is configured to cause the liquid to flow through the valve toward an outside of the battery pack.

4. The apparatus of claim 1, wherein the member is a first member, the apparatus further comprising a second member coupled to at least one of the base plate or the first member, wherein the base plate, the first member, and the second member at least partially define the cavity for a battery.

5. The apparatus of claim 1, wherein the member is a cross member extending laterally between side retaining members of the apparatus.

6. The apparatus of claim 5, wherein the member defines the channel in one of a central portion or a lower portion of the cross member.

7. The apparatus of claim 1, wherein the member is a side retaining member extending between a front retaining member of the apparatus and the rear retaining member of the apparatus.

8. The apparatus of claim 1, wherein the base plate does not include any through holes.

9. The apparatus of claim 1, wherein the base plate includes a plurality of through holes, and wherein substantially all of the through holes are filled or covered.

10. The apparatus of claim 1, wherein the valve is configured to allow the liquid to exit in response to an activation pressure.

11. A battery frame, comprising:
a plurality of members coupled to a base plate to at least partially form a cavity for a battery, the cavity configured to collect liquid, one of the members comprising:
a channel configured to receive the liquid from the cavity and direct the liquid toward a valve configured to allow the liquid to exit the battery frame, wherein the valve is located on a rear retaining member of the battery frame.

12. The battery frame of claim 11, wherein the one member is a cross member extending laterally between side retaining members of the battery frame.

13. The battery frame of claim 11, wherein the one member is a side retaining member extending between a front retaining member of the battery frame and the rear retaining member of the battery frame.

14. The battery frame of claim 11, wherein the valve is configured to allow the liquid to exit in response to an activation pressure.

15. A method, comprising:
receiving liquid collected in a cavity at one or more openings in a member of a battery frame, the member coupled to a base plate and extending from the base plate; and
directing liquid via a channel of the member toward a valve configured to allow the liquid to exit the battery frame, wherein the valve is located on a rear retaining member of the battery frame.

16. The method of claim 15, further comprising causing the liquid to exit from the battery frame.

17. The method of claim 15, wherein directing the liquid toward the valve comprises causing fluid to flow from an area of the battery frame comprising a battery toward the valve.

18. The method of claim 15, wherein the member is a first member, wherein the battery frame comprises a second member coupled to at least one of the base plate or the first member, wherein the base plate, the first member, and the second member at least partially define the cavity for a battery.

19. The method of claim 15, wherein the member is one of:
a cross member extending laterally between side retaining members of the battery frame; or
a side retaining member extending between a front retaining member of the battery frame and the rear retaining member of the battery frame.

20. The method of claim 15, further comprising allowing the liquid to exit via the valve in response to an activation pressure of the valve.

* * * * *